(12) United States Patent
Bakopoulos et al.

(10) Patent No.: US 11,570,125 B2
(45) Date of Patent: Jan. 31, 2023

(54) FAST OPTICAL SWITCH

(71) Applicant: Mellanox Technologies, Ltd., Yokneam (IL)

(72) Inventors: Paraskevas Bakopoulos, Ilion (GR); Ioannis (Giannis) Patronas, Piraeus (GR); Elad Mentovich, Tel Aviv (IL)

(73) Assignee: Mellanox Technologies, Ltd., Yokneam (IL)

( * ) Notice: Subject to any disclaimer, the term of this patent is extended or adjusted under 35 U.S.C. 154(b) by 279 days.

(21) Appl. No.: 16/985,634

(22) Filed: Aug. 5, 2020

(65) Prior Publication Data

US 2022/0029933 A1    Jan. 27, 2022

(30) Foreign Application Priority Data

Jul. 24, 2020 (GR) .............................. 20200100439

(51) Int. Cl.
*H04L 12/933*  (2013.01)
*H04L 49/103*  (2022.01)
*H04Q 11/00*  (2006.01)
*H04L 49/15*  (2022.01)

(52) U.S. Cl.
CPC ........ *H04L 49/103* (2013.01); *H04L 49/1507* (2013.01); *H04Q 11/0005* (2013.01); *H04Q 2011/0052* (2013.01)

(58) Field of Classification Search
CPC .............. H04L 49/103; H04L 49/1507; H04Q 11/0005; H04Q 2011/0052; H04Q 2011/005; H04J 14/02; G06F 15/7878; G02F 1/31
See application file for complete search history.

(56) References Cited

U.S. PATENT DOCUMENTS

2011/0225415 A1 * 9/2011 Yamada .............. G06F 15/7878
    713/100
2020/0343680 A1 * 10/2020 Lange ..................... H04J 14/02

FOREIGN PATENT DOCUMENTS

CA        2310856 A1 * 12/2001 ............... G02F 1/31

OTHER PUBLICATIONS

B. G. Lee and N. Dupuis, "Silicon Photonic Switch Fabrics: Technology and Architecture," in Journal of Lightwave Technology, vol. 37, No. 1, pp. 6-20, 1 Jan. 1, 2019. doi: 10.1109/JLT.2018.2876828.

(Continued)

*Primary Examiner* — Vinncelas Louis
(74) *Attorney, Agent, or Firm* — Alston & Bird LLP

(57) ABSTRACT

A fast optical switch and networks comprising fast optical switches are disclosed herein. In an example embodiment, a fast optical switch includes two or more fabric switches; a first selector switch; and a second selector switch. The first selector switch may selectively pass a signal to one of the two or more fabric switches. The one of the two or more fabric switches may act on the received signal to provide a switched signal and the second selector switch may selectively receive the switched signal provided by the one of the two or more fabric switches. A slot of the fast optical switch comprises a transmission window of one of the two or more fabric switches that occurs in parallel with at least a portion of a reconfiguration window of the other of the two or more fabric switches.

19 Claims, 4 Drawing Sheets

(56) References Cited

OTHER PUBLICATIONS

T. Seok, N. Quack, S. Han, R. Muller, and M. Wu, "Large-scale broadband digital silicon photonic switches with vertical adiabatic couplers," Optica 3, 64-70 (2016).
H. Y. Hwang et al., "128 x 128 silicon photonic MEMS switch package using glass interposer and pitch reducing fibre array," 2017 IEEE 19th Electronics Packaging Technology Conference (EPTC), Singapore, 2017, pp. 1-4. doi: 10.1109/EPTC.2017.8277436.
K. Nashimoto, "PLZT Waveguide Devices for High Speed Switching and Filtering," OFC/NFOEC 2008—2008 Conference on Optical Fiber Communication/National Fiber Optic Engineers Conference, San Diego, CA, 2008, pp. 1-3.
Asakura, Hideaki & Nashimoto, Keiichi & Kudzuma, David & Kawashima, Hitoshi & Tsuda, Hiroyuki. (2013). High-speed hybrid integrated, 1x2 wavelength selective switch using PLZT optical switches and silica planar lightwave circuits. Technical Digest of the 18th Microoptics Conference, MOC 2013, 1-2.

\* cited by examiner

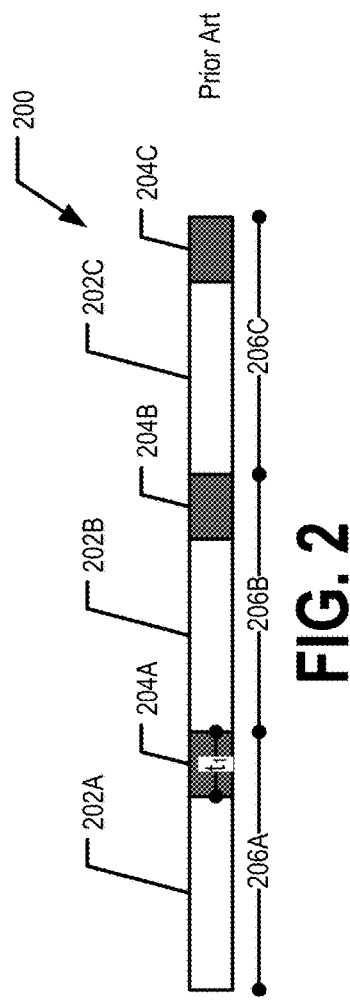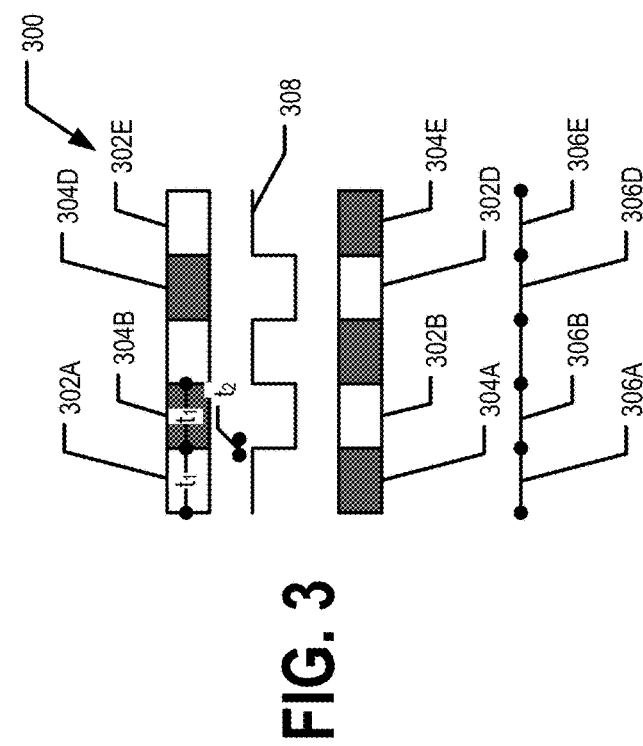

FAST OPTICAL SWITCH

CROSS-REFERENCE TO RELATED APPLICATIONS

This application claims priority to Greek Application No. 20200100439, filed Jul. 24, 2020, the content of which is hereby incorporated by reference herein in its entirety.

BACKGROUND

Datacenters are the storage and data processing hubs of the internet. The massive deployment of cloud applications is causing datacenters to expand exponentially in size, stimulating the development of faster switches in order to cope with the increasing data traffic inside the datacenter. Current state-of-the-art switches are capable of handling 12.8 Tb/s of traffic by employing application-specific integrated circuits (ASICs) equipped with 256 data lanes, each operating at 50 Gb/s. Such switch ASICs typically consume as much as 400 W, whereas the power consumption of the optical transceiver interfaces attached to the ASIC is comparable.

To keep pace with traffic demand, switch capacity has to be doubled approximately every 2 years. So far, this rapid scaling was possible by exploiting advances in complementary metal-oxide-semiconductor (CMOS) manufacturing, collectively described by Moore's law (i.e., the observation that the number of transistors in a dense integrated circuit doubles about every two years). However, in recent years there are strong indications of Moore's law slowing down, which raises concerns as per the capability to sustain the target scaling rate of switch capacity. Alternative technological approaches have been identified, such as the co-integration of photonics and electronics in multi-chip modules, which are expected to enable the development of datacenter switches with up to 100 Tb/s capacity. However, it is expected that further scaling will not be possible in a way that is viable from the technological, economic, and power consumption perspective.

BRIEF SUMMARY

Various embodiments provide a fast optical switch configured to provide a high capacity throughput. In various embodiments, the length of the guardband is approximately and/or substantially equal to the reconfiguration time of a selector switch (i.e., significantly shorter than the reconfiguration time of a fabric switch. The reconfiguration time of a selector switch is referred to as a switching time herein. For example, the fast optical switch is an optical switch that may be implemented to have a link usage of greater than 90%. For example, the fast optical switch may be implemented to have a link usage of greater than 95%. For example, the fast optical switch is configured to minimize the effect of reconfiguration time on the link usage of the switch.

In various embodiments, the fast optical switch comprises first and second fabric switches and first and second selector switches. The first and second selector switches have a switching time that is smaller and/or shorter than the reconfiguration time of the first and second fabric switches. For example, the first and second fabric switches may have a reconfiguration time that is at least one order of magnitude (e.g., at least a factor of ten) greater than the switching time of the first and second selector switches. The first and second selector switches are configured to selectively pass and receive, respectively, a signal to one of the first fabric switch or the second fabric switch. For example, the first and second selector switches may cause a first signal to be provided through the first fabric switch during a first slot and then cause a second signal to be provided through the second fabric switch during an immediately succeeding second slot. The second fabric switch may be reconfigured during the first slot and the first fabric switch may be reconfigured during the second slot. Thus, the guardband may be reduced to the switching time of the first and second selector switches, which is significantly less (e.g., at least an order of magnitude less) than the reconfiguration time of the first and second fabric switches. fast optical switch According to a first aspect of the present disclosure, a fast optical switch is provided. In an example embodiment, the fast optical switch comprises two or more fabric switches; a first selector switch; and a second selector switch. The first selector switch is configured to selectively pass a signal to one of the two or more fabric switches. Based at least in part on the current permutation of the one of the two or more fabric switches that received the signal, the one of the two or more fabric switches provides a switched signal to the second selector switch and the second selector switch is configured to selectively receive the switched signal provided by the one of the two or more fabrics switches.

In an example embodiment, the two or more fabric switches have a reconfiguration time and the first selector switch and the second selector switch have a switching time, wherein the reconfiguration time is longer than the switching time. In an example embodiment, the reconfiguration time is the (longest) time required for one of the two or more fabric switches to reconfigure its internal parts in order to implement a different permutation. In an example embodiment, a slot of the fast optical switch comprises a transmission window of one of the two or more fabric switches that occurs in parallel with at least a part of reconfiguration windows of the other of the two or more fabric switches. In an example embodiment, the two or more fabric switches have a reconfiguration time and a slot of the fast optical switch is substantially equal to or less than the reconfiguration time. In an example embodiment, the two or more fabric switches comprise n fabric switches (n an integer greater than or equal to two) and the slot of the fast optical switch is substantially equal to the reconfiguration time divided by (n— 1). In an example embodiment, each of the two or more fabric switches, the first selector switch, and the second selector switch is an optical switch. In an example embodiment, each of the two or more fabric switches comprises a collection of switches arranged in a matrix configuration. In an example embodiment, a guardband of the fast optical switch is approximately and/or substantially equal to the switching time of the first and second selector switches. In an example embodiment, the first and second selector switches are configured to select a fabric switch of the two or more fabric switches responsive to at least one of (a) an electrical or optical signal or (b) a wavelength that characterizes a signal to be provided/received responsive to the selection. In an example embodiment, the two or more fabric switches are each configured to reconfigure to a particular permutation responsive to an electrical or optical signal indicating the particular permutation.

According to another aspect of the present disclosure an optical network is provided. In an example embodiment, the optical network comprises at least one optical transmitter element; at least one optical receiver element; and at least one fast optical switch disposed in an optical path between the at least one optical transmitter element and the at least one optical receiver element. In an example embodiment, the at least one fast optical switch comprises two or more fabric switches; a first selector switch; and a second selector switch. The first selector switch is configured to selectively pass a signal (e.g., provided by the at least one optical transmitter element) to one of the two or more fabric switches. Based at least in part on the current permutation of the one of the two or more fabric switches that received the signal, the one of the two or more fabric switches provides a switched signal to the second selector switch. The second selector switch is configured to selectively receive the switched signal provided by the one of the two or more fabric switches and provide the switched signal to at least one optical receiver element.

In an example embodiment, reconfiguration of the two or more fabric switches is characterized by a reconfiguration time and reconfiguration of the first selector switch and the second selector switch is characterized by a switching time, wherein the reconfiguration time is longer than the switching time. In an example embodiment, the reconfiguration time is the (longest) time required for a fabric switch of the two or more fabric switches to reconfigure its internal parts in order to implement a different permutation. In an example embodiment, a slot of the fast optical switch comprises a transmission window of one of the two or more fabric switches that occurs in parallel with at least a part of reconfiguration windows of the other of the two or more fabric switches. In an example embodiment, the two or more fabric switches have a reconfiguration time and a slot of the fast optical switch is substantially equal to the reconfiguration time. In an example embodiment, the two or more fabric switches comprise n fabric switches (n an integer greater than or equal to two) and the slot of the fast optical switch is substantially equal to the reconfiguration time divided by (n−1). In an example embodiment, each of the two or more fabric switches, the first selector switch, and the second selector switch is an optical switch. In an example embodiment, each of the two or more fabric switches comprises a collection of switches arranged in a matrix configuration. In an example embodiment, a guardband of the fast optical switch is approximately and/or substantially equal to the switching time of the first and second selector switches. In an example embodiment, the first and second selector switches are configured to select a fabric switch of the two or more fabric switches responsive to at least one of (a) an electrical or optical signal or (b) a wavelength that characterizes a signal to be provided/received responsive to the selection. In an example embodiment, each of the two or more fabric switches is configured to reconfigure to a particular permutation responsive to an electrical or optical signal indicating the particular permutation.

BRIEF DESCRIPTION OF THE DRAWING(S)

Having thus described the invention in general terms, reference will now be made to the accompanying drawings, which are not necessarily drawn to scale, and wherein:

FIG. 2 is a diagram illustrating conventional slot timing for an optical switch;

FIG. 3 is a diagram illustrating slot timing for a fast optical switch according to an example embodiment;

DETAILED DESCRIPTION OF THE INVENTION

Figure 1:
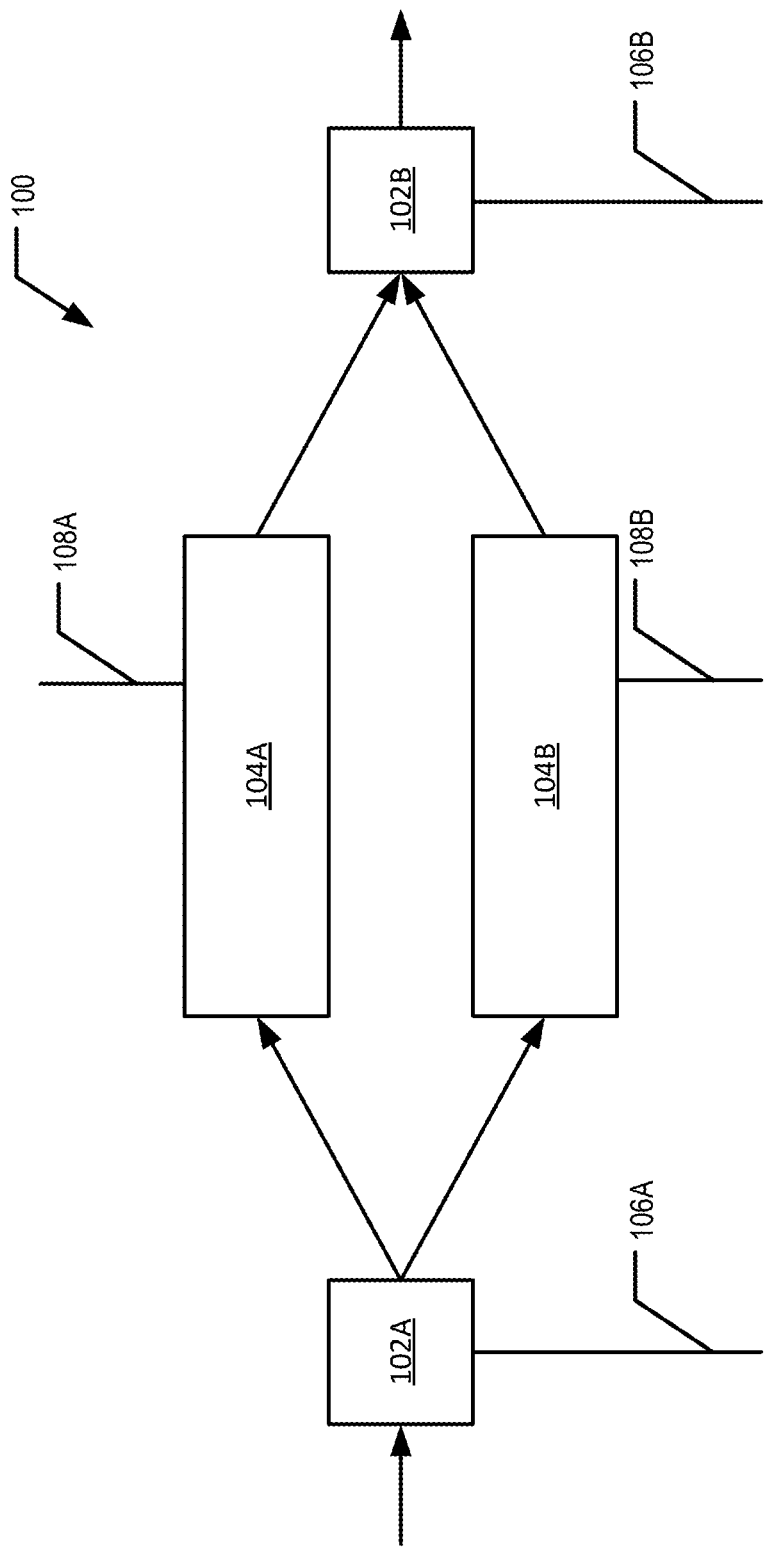
FIG. 1 is a block diagram of an example fast optical switch according to an example embodiment.

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, terms such as "top," "about," "around," etc. are used for explanatory purposes in the examples provided below to describe the relative position of certain components or portions of components. As used herein, the terms "substantially" and "approximately" refer to tolerances within manufacturing and/or engineering standards.

As noted above, scaling of datacenter switch capacity to expected datacenter requirements poses a technical problem. Optical switching is gaining traction as a candidate enabling technology, owing to the technology's potential for very high data capacity and low power consumption. Optical switching introduces the notion of devices called optical switches, which feature optical input and output ports and are capable of routing the light that is coupled to their input ports to the intended output ports on demand, according to one or more control signals (electrical or optical). Routing of the signals is performed in the optical domain, i.e., without the need for optical-electrical and electrical-optical conversion, thus bypassing the need for power-consuming transceivers. Header processing and buffering of the data is not possible in the optical domain and thus, packet switching (as it is realized in the networks that consist of electrical switches) cannot be employed. Instead, the circuit switching paradigm is used: an end-to-end circuit is created for the communication between two devices. The vast majority of optical switching network proposals follow the Time-Division Multiple Access (TDMA) approach; the time is divided into slots. Each slot comprises a transmission window and a guardband. The transmission windows are used for data transmission and the guardbands provide time for the optical switch to be reconfigured between packets. Effectively, the network pauses during the guardbands to enable the optical switch to reconfigure. The duration of the slots is dictated mainly by the reconfiguration capabilities of the optical switch.

The optical networks that are designed to use optical switches work in a slotted manner: the time is divided into slots comprising transmission windows and dead time (guardbands) between the transmission windows within which data is transmitted. Each optical switch has a non-zero reconfiguration time and during this reconfiguration time data cannot traverse the optical switch. The reconfiguration time of a switch is the time needed for the optical switch to "re-organize" its internal parts in order to implement different permutations (i.e., connections among the inputs and the outputs of the switch). Thus, during the reconfiguration time, data transmission from the devices connected to the optical switches is not permitted. In order to achieve a reasonable network utilization, the slot time is generally defined as at least ten times the reconfiguration time. For example, 90% of the time data transmission is permitted while for 10% of the time it is not permitted because of reconfiguration (e.g., the slot is 90% transmission window and 10% guardband). Thus, conventionally, optical switched networks only permit 90% link utilization in order to maintain reasonable slot duration. This fact has severe consequences on the performance of the network. For a reconfiguration duration of 1 µs, the slot becomes 10 µs, which is much longer than the time needed to transmit an Ethernet or InfiniBand packet. Thus, the conventional networks suffer from technical problems of high latency and low utilization for a variety of traffic patterns, and usually 5%-10% of the time is not used for data transmission.

Various embodiments provide technical solutions to these technical problems. In particular, various embodiments provide an optical switch that minimizes the duration of the slot in optical switching networks by reducing, minimizing, and/or eliminating the need for the pausing of the network's operation during the reconfiguration of the optical switches. For example, the size of the slot may be reduced by removing the guardband from the slot and/or defining a slot that is approximately equal to the length of the transmission window. Various embodiments enable the use of short slots (e.g., slots that are approximately 0.5 to 8 µs long), which enables better network utilization. Moreover, various embodiments serve to reduce the latency of the network. As such, the various embodiments described herein improve the operation of networks that employ optical switches.

FIG. 1 illustrates an example fast optical switch 100 of an example embodiment. In various embodiments, a fast optical switch 100 comprises a first fabric switch 104A, a second fabric switch 104B, a first selector switch 102A, and a second selector switch 102B. In various embodiments, the fast optical switch 100 is an integrated switch (e.g., hybridly integrating different types of switches) or a subsystem that combines separate switch modules. The first fabric switch 104A is in electrical or optical communication with a first fabric switch controller via an optical or electrical line 108A such that the first fabric switch 104A may be reconfigured (e.g., through application of a control signal via the optical or electrical line 108A). The second fabric switch 104B is in electrical or optical communication with a second fabric switch controller via an optical or electrical line 108B such that the second fabric switch 104B may be reconfigured (e.g., through application of a control signal via the optical or electrical line 108B). For example, the first and second fabric switches 104A, 104B may be configured to reconfigure to a particular permutation responsive to an electrical or optical signal indicating the particular permutation and passed to the respective switch via the corresponding optical or electrical line 108A, 108B. The first selector switch 102A is in electrical or optical communication with a first selector switch controller via an optical or electrical line 106A such that the first selector switch 102A may be reconfigured (e.g., through application of a control signal via the optical or electrical line 106A). For example, the first and second selector switches 102A, 102B may be configured to switch between providing and/or receiving signals to/from the first or second fabric switch 104A, 104B responsive to an electrical or optical signal passed to the respective switch via the corresponding optical or electrical line 106A, 106B.

In various embodiments, the first and second fabric switches 104A, 104B are fabric switches. For example, each of the first and second fabric switches 104A, 104B may comprise a collection of switches arranged in a matrix configuration. For example, the first and/or second fabric switch 104A, 104B may be a crossbar switch. The first fabric switch and the second fabric switch may have similar or substantially equal reconfiguration times. For example, the first fabric switch and the second fabric switch may have a reconfiguration time $t_1$, which is the time required for internal parts of the corresponding fabric switch to be reconfigured in order to implement a different permutation of the switch (e.g., connecting of an input to a desired output, and/or the like). In an example embodiment, the fast optical switch 100 may comprise more than two fabric switches 104. In various embodiments, the two or more fabric switches 104 may have the same blocking characteristics and/or the same number of input and/or output ports. In various embodiments, the fast optical switch 100 may have different functionality, connectivity, blocking characteristics, input and/or output ports, and/or the like.

In various embodiments, the first and second selector switches 102A, 102B are configured to select between the first fabric switch 104A and the second fabric switch 104B. In an example embodiment, the first and second selector switches 102A, 102B are space switches, meaning that the output port (e.g., fabric switch 104) is chosen by reconfiguring the internal parts of the selector switch 102. For example, the configuration of the internal parts of the selector switch 102 may determine which of the fabric switches 104 the selector switch 102 provides a signal to and/or receives a signal from. In various embodiments, a selector switch 102 may amplify a signal. For example, in an example embodiment, a selector switch 102 may be implemented with a coupler and two or more semiconductor optical amplifiers (SOAs) (e.g., n SOAs).

In an example embodiment, the first and second selector switches 102A, 102B are passive wavelength switches, meaning the output port is selected based on the optical wavelength of the signal. For example, a transmitter may comprise and/or be in communication with a tunable laser and/or multiple lasers of different wavelengths. The wavelength of light used by the transmitter to provide the signal (e.g., the wavelength the transmitter causes the tunable laser and/or two or more lasers of different wavelengths to emit the signal at) is determined by the fabric switch 104 that the signal is to be processed and/or passed through. For example, for an optical switch comprising two fabric switches 104, the transmitter may cause a signal characterized by a first wavelength to be provided to the fast optical switch 100 during a first slot and a signal characterized by a second wavelength to be provided to the fast optical switch 100 during a second (consecutive) slot, wherein the first selector switch 102A provides the signals to one of the first or second fabric switches 104A, 104B based on wavelength characterizing the signal. In another example, for an optical switch comprising three fabric switches 104, the transmitter may cause a signal characterized by a first wavelength to be provided to the fast optical switch 100 during a first slot, a signal characterized by a second wavelength to be provided to the fast optical switch 100 during a second (consecutive) slot, and a signal characterized by a third wavelength to be provided to the fast optical switch 100 during a third (consecutive) slot, wherein the first selector switch 102A provides the signals to one of the first, second, or third fabric switches 104 based on the wavelength characterizing the signal. As should be understood, in these examples, the first, second, and third wavelengths are different wavelengths. For example, the first selector switch 102A may be a passive arrayed waveguide grating (AWG) demultiplexer and/or the second selector switch 102B may be a passive AWB multiplexer. In such an example, the switching time is dictated based on the tuning time of the tunable laser. In an example embodiment, the tuning time of the tunable laser is on the nanoseconds scale. Thus, the switching time using passive waveguide selector switches is significantly shorter than the reconfiguration time of the fabric switches 104.

In various embodiments, the first and second selector switches 102A, 102B have a switching time that is significantly short than the reconfiguration time of the first and second (and any additional) fabric switches 104A, 104B. For example, the switching time of the first and second selector switches 102A, 102B may be at least an order of magnitude less than the reconfiguration time of the fabric switches 104. For example, the first selector switch 102A and the second selector switch 102B may be configured to selectively provide and/or receive a signal to or from (respectively) either the first fabric switch 104A or the second fabric switch 104B. For example, the first selector switch 102A may be a demultiplexer and/or the second selector switch 102B may be a multiplexer. In various embodiments, the first selector switch 102A is a 1 to n switch and/or demultiplexer and the second selector switch 102B is an n to 1 switch and/or multiplexer. For example, during a first slot, the first and second selector switches 102A, 102B may provide and/or receive a first signal to/from the first fabric switch 104A. The second fabric switch 104B may be reconfigured during the first slot. After completion of the first slot, the first and second selector switches 102A, 102B may be reconfigured such that during a second slot that immediately follows the first slot, the first and second selector switches 102A, 102B provide and/or receive a second signal to/from the second fabric switch 104B. The first fabric switch 104A may be reconfigured during the second slot. In other words, while one of the first and second fabric switches 104A, 104B participates in a transmission window, the other of the first and second fabric switches 104A, 104B participates in a reconfiguration window such that a slot of the fast optical switch 100 comprises a simultaneous transmission window and reconfiguration window rather than the serial transmission window and guardband of a single fabric switch used as an individual network element. In an example embodiment, the fast optical switch comprises n fabric switches 104 (wherein n is an integer equal to or greater than two) and the slot may be as short as approximately the length of the reconfiguration time of the fabric switches 104 divided by n−1.

The first and second selector switches 102A, 102B may have a switching time $t_2$. For example, the switching time $t_2$ may be the time required for switching the selection of the switch (e.g., the first and/or second switches 102A, 102B) switch between a first selection and a second selection (e.g., to switch between an internal configuration configured for providing or receiving a signal to/from the first fabric switch to an internal configuration configured for providing or receiving a signal to/from the second fabric switch, or vice versa). In various embodiments, the switching time $t_2$ is less than the reconfiguration time $t_1$. For example, the first and second selector switches 102A, 102B may be one-to-two or two-to-one switches. For example, the first selector switch 102A may have one input and two outputs and the second selector switch 102B may have two inputs and one output. Therefore, in this example, the switching time $t_2$ (e.g., the reconfiguration time of the first and second selector switches 102A, 102B) is significantly less than the reconfiguration time $t_1$ (e.g., the reconfiguration time of the first and second fabric switches 104A, 104B). For example, the reconfiguration time $t_1$ may be approximately ten times, one hundred times, or a thousand times longer than the switching time $t_2$. For example, in an example embodiment, the reconfiguration time $t_1$ is approximately 1 μs and the switching time $t_2$ is approximately 10 ns.

FIG. 2 illustrates an example of a conventional slot timing 200 for an optical switch. Each of the conventional slots 206A, 206B, 206C comprises a transmission window 202A, 202B, 202C and a guardband 204A, 204B, 204C. During the guardband, no data is transmitted. In an example configuration, each of the conventional slots 206A, 206B, 206C is 10 μs long, each of the transmission windows 202A, 202B, 202C is 9 μs long, and each of the guardbands 204A, 204B, 204C is 1 μs long.

In contrast to the conventional slot timing 200 shown in FIG. 2, FIG. 3 shows a slot timing 300 for an example embodiment of the fast optical switch 100. Each slot 306 (e.g., 306A-306E) comprises a simultaneous transmission window 302 (e.g., 302A-302E) and reconfiguration window 304 (e.g., 304A-304E). Line 308 indicates which of the first and second fabric switches 104A, 104B is selected, by the first and/or second selector switches 102A, 102B to be provided the signal during each slot, The vertical portions of line 308 correspond to the reconfiguration of the first and second selector switches 102A, 102B. As shown in FIG. 3, the switching time $t_2$ (the reconfiguration time of the first and second selector switches 102A, 102B) is significantly smaller than the reconfiguration time $t_1$ (the reconfiguration time of the first and second fabric switches 104A, 104B). As the switching time $t_2$ is at least an order of magnitude (e.g., at least one factor of ten) smaller than the reconfiguration time $t_1$ (e.g., $10t_2 \leq t_1$), the time duration of a slot 306 is approximately and/or substantially equal to the time duration of the transmission window 302 and/or reconfiguration window 304. For example, the slot 306 is approximately and/or substantially equal to the length of the reconfiguration time $t_1$ of the fabric switches 104. For example, the guardband is approximately and/or substantially equal to the switching time $t_2$. In various embodiments, the time duration of the transmission window 302 may be approximately equal to the reconfiguration time $t_1$. For example, each of the slots 306 may be approximately 1 μs long (e.g., $\approx t_1$).

In the example shown in FIG. 3, during a first slot 306A, the first and second selector switches 102A, 102B are configured to provide a first signal to the first fabric switch 104A during the transmission window 302A of the first fabric switch 104A and the reconfiguration window 304A of the second fabric switch 104B, as indicated by line 308. The first and second selector switches 102A, 102B may then be reconfigured such that during a second slot 306B the first and second selector switches 102A, 102B are configured to provide a second signal to the second fabric switch 104B during the transmission window 302B of the second fabric switch 104B and the reconfiguration window 304B of the first fabric switch 104A, as indicated by line 308. The second slot 306B immediately follows the first slot 306A. In other words, there are no slots between the first slot 306A and the second slot 306B. This alternation between (a) the first fabric switch 104A being operated to have a transmission window and the second fabric switch 104B being operated to have a reconfiguration window in parallel during one slot and (b) the first fabric switch 104A being operated to have a reconfiguration window and the second fabric switch 104B being operated to have a transmission window in parallel during an immediately succeeding slot continues during the operation of the fast optical switch 100. The fast optical switch 100 is referred to as "fast" herein because the switch may be implemented with a slot that is shorter than the slot of the conventional slot timing 200.

Figure 3A:
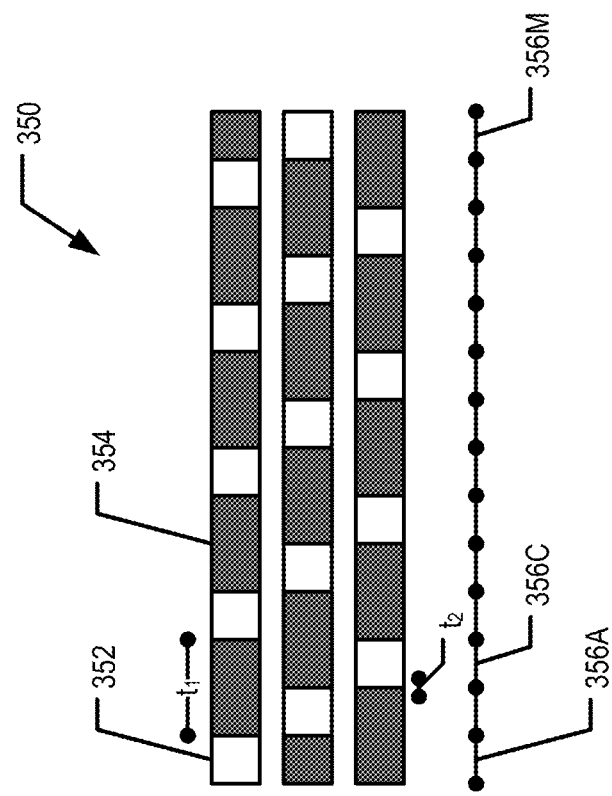
FIG. 3A is a diagram illustrating slot timing for a fast optical switch according to another example embodiment.

FIG. 3A illustrates an example slot timing 350 for another example embodiment of a fast optical switch 100. The slot timing 350 corresponds to a fast optical switch comprising three fabric switches 104, a first selector switch 102A that is a 1×3 demultiplexer switch, and a second selector switch 102B that is a 3×1 multiplexer switch. The slots 356 (e.g., slots 356A, 356B, 356M) are approximately and/or substantially equal to the reconfiguration time of the fabric switches 104 divided by two (e.g., 3–1). Each slot 356 comprises a transmission window 352 (illustrated by the white rectangles) and two at least partially overlapping reconfiguration windows 354 (illustrated as the dark rectangles). For example, during a first slot, a first fabric switch 104 may experience a transmission window, a second fabric switch 104 may experience at least a portion of a reconfiguration window, and a third fabric switch 104 may experience at least a portion of a reconfiguration window. During a second (consecutive) slot, the first fabric switch 104 may experience at least a portion of a reconfiguration window, the second fabric switch 104 may experience a transmission window, and a third fabric switch 104 may experience at least a portion of a reconfiguration window. During a third (consecutive) slot, the first fabric switch 104 may experience at least a portion of a reconfiguration window, the second fabric switch 104 may experience at least a portion of a reconfiguration window, and a third fabric switch 104 may experience a transmission window. During a fourth (consecutive) slot, a first fabric switch 104 again experiences a transmission window, while the second and third fabric switches 104 each experience at least a portion of a respective reconfiguration window. As shown in FIG. 3A, the guardband of the slot 356 is approximately and/or substantially equal to the switching time of the switching time $t_2$ and the length/duration of the slot 356 is less than the reconfiguration time of the fabric switches 104.

In various embodiments, as the transmission window of one of the first and second fabric switches 104A, 104B (and/or additional fabric switches) occurs in parallel with the reconfiguration window of the other of the first and second fabric switches 104A, 104B (and/or additional fabric switches), the guardband may be approximately and/or substantially equal to the switching time of the selector switches 102A, 102B, which is significantly shorter (e.g., at least an order of magnitude shorter) than the reconfiguration time of the fabric switches 104A, 104B. As the switching time of the selector switches 102A, 102B is at least an order of magnitude shorter than the reconfiguration time of the fabric switches 104A, 104B, a fast optical switch may be implemented with a slot that is approximately and/or substantially equal to (or less than) the reconfiguration time of the fabric switches 104. For example, this enables the fast optical switch 100 to be implemented with a link utilization that is greater than 95%. For example, the link utilization of the fast optical switch 100 may be 99% or greater, in various embodiments.

Figure 4:
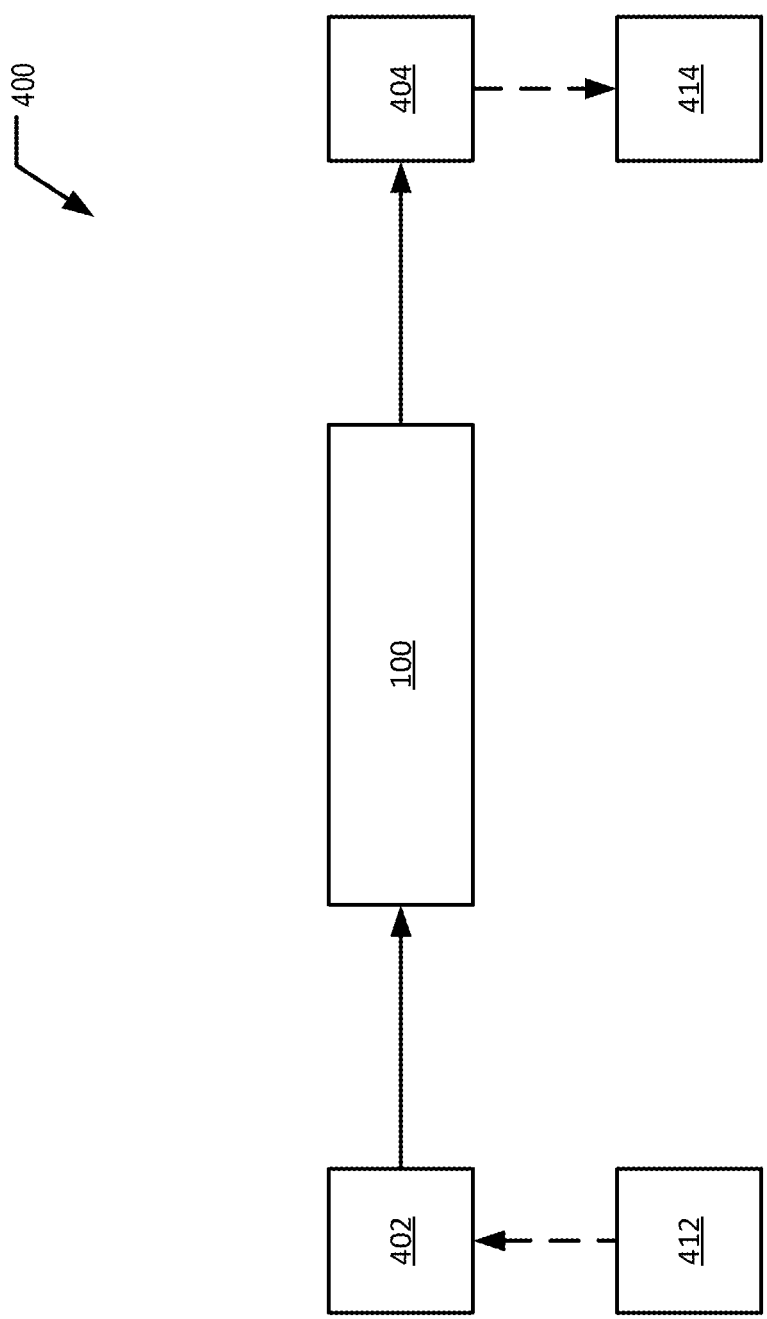
FIG. 4 is a block diagram of a portion of a network comprising a fast optical switch according to an example embodiment.

FIG. 4 is a block diagram of at least a portion of an example network 400 comprising a fast optical switch 100. In various embodiments, the network 400 is part of a datacenter. For example, the network 400 may be a communication network configured to enable high speed, high capacity communication between two or more computing entities, computing devices, computer readable media, processing circuitry, and/or other circuitry. For example, the network 400 may comprise one or more transmitter elements 402, one or more receiver elements 404, and one or more fast optical switches 100 configured to enable and/or control communication between at least subsets of the one or more transmitter elements 402 and one or more receiver elements 404. For example, the one or more fast optical switches 100 may be configured to control and/or at least partially provide optical links and/or communications paths of the network 400 to enable communication between one or more computing entities, computing devices, computer readable media, processing circuitry, and/or other circuitry of a datacenter, server network, multiple processor/core computing network, and/or the like. In various embodiments, a transmitter element 402 is an optical transmitter or transceiver. In various embodiments, a receiver element 404 is an optical receiver or transceiver. The transmitter elements 402 and/or receiver elements 404 may each be part of and/or in communication with one or more computing entities, computing devices, computer readable media, processing circuitry, and/or other circuitry. For example, the transmitter elements 402 and/or receiver elements 404 may each be in communication (e.g., electrical and/or optical communication) with one or more computing entities, computing devices, computer readable media, processing circuitry, and/or other circuitry of a datacenter.

For example, a transmitting computing entity 412 may cause a transmitting element 402 to provide a signal to a fast optical switch 100. In this example, the first selector switch 102A of the fast optical switch 100 receives the signal and passes and/or provides the signal to one of the first fabric switch 104A or the second fabric switch 104B based on the configuration of the first selector switch 102A. The configuration of the first selector switch 102A may cause the signal to be provided to whichever of the first or second fabric switches 104A, 104B is experiencing a transmission window 302 in the slot 306 during which the signal is being provided. For example, the first selector switch 102A may be configured to not pass and/or provide the signal to whichever of the first or second fabric switches 104A, 104B is experiencing a reconfiguration window 304 during the slot 306 during which the signal is being provided. Whichever of the first or second fabric switches 104A, 104B received the signal (e.g., and is experiencing the transmission window 302 during the slot 306) acts upon the signal to generate a switched signal. For example, the signal may be passed from the input of the corresponding one of the first or second fabric switch 104A, 104B to at least one output of the corresponding one of the first or second fabric switch 104A, 104B based on the permutation (e.g., the current internal configuration) of the corresponding one of the first or second fabric switch 104A, 104B to generate and/or provide a switched signal. The switched signal is then provided by the corresponding one of the first or second fabric switch 104A, 104B to the second selector switch 102B. The second selector switch 102B is configured to receive the switched signal from the same one of the first or second fabric switch 104A, 104B to which the first selector switch 102A provided the signal. The second selector switch 102B may provide the switched signal such that a receiver element 404 in communication with a receiving computing entity 414 receives the switched signal and provides an indication of the switched signal to the receiving computing entity 414.

In practice, implementation of the fast optical switch duplicates a network using optical switches (e.g., fabric switches 104) between the transmitter and receiver elements 402, 404. For example, implementation of the fast optical switch may create a duplicate network of fabric switches 104 and selector switches 102 may be added between the transmitter elements 402 and the fabric switches of the networks of optical switches and between the fabric switches of the networks of optical switches and the receiver elements 404. For example, two or more instances of the same network may be generated, built, and/or the like. For each slot, the selector switches 102 select one of the instances of network to use for transmitting data during that slot. The other instances of the network can be at least partially reconfigured during a slot that they are not being used to for transmitting data. For example, the network 400 may use the fabric switches 104 of an instance of the network on every other slot and that instance of the network will reconfigure during the opposite every other slot (e.g., in an example embodiment having two instances of the network).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An optical switch comprising:
two or more fabric switches;
a first selector switch; and
a second selector switch,
wherein the first selector switch is configured to selectively pass a signal to one of the two or more fabric switches,
wherein the one of the two or more fabric switches that received the signal is configured to provide a switched signal to the second selector switch,
wherein the second selector switch is configured to selectively receive the switched signal provided by the one of the two or more fabric switches, and
wherein reconfiguration of the two or more fabric switches is characterized by a reconfiguration time, reconfiguration of the first selector switch and the second selector switch is characterized by a switching time, and the reconfiguration time of the fabric switches is longer than the switching time of the selector switches.

2. The optical switch of claim 1, wherein a slot of the optical switch comprises a transmission window of one of the two or more fabric switches that occurs at least in part in parallel with a reconfiguration window of the other of the two or more fabric switches.

3. The optical switch of claim 1, wherein a slot of the optical switch is substantially equal to or less than the reconfiguration time of the fabric switches.

4. The optical switch of claim 3, wherein the two or more fabric switches comprise n fabric switches, n an integer greater than or equal to two, and the slot of the optical switch is substantially equal to the reconfiguration time divided by (n−1).

5. The optical switch of claim 1, wherein each of the two or more fabric switches, the first selector switch, and the second selector switch is an optical switch.

6. The optical switch of claim 1, wherein each of the two or more fabric switches comprises a collection of switches arranged in a matrix configuration.

7. The optical switch of claim 1, wherein at least one of the first and second selector switches is configured to amplify the signal or switched signal, respectively.

8. The optical switch of claim 1, wherein the first and second selector switches are configured to select a fabric switch of the two or more fabric switches responsive to at least one of (a) an electrical or optical signal or (b) a wavelength that characterizes a signal to be provided/received responsive to the selection.

9. The optical switch of claim 1, wherein the two or more fabric switches are configured to reconfigure to a particular permutation responsive to an electrical or optical signal indicating the particular permutation.

10. The optical switch of claim 1, wherein the optical switch is configured to be controlled such that (a) reconfiguration of the first fabric switch occurs while the first selector switch is configured to pass the signal to the second fabric switch and the second selector switch is configured to receive the switched signal from the second fabric switch and (b) reconfiguration of the second fabric switch occurs while the first selector switch is configured to pass the signal to the first fabric switch and the second selector switch is configured to receive the switched signal from the first fabric switch.

11. An optical network comprising:
at least one optical transmitter element;
at least one optical receiver element;
at least one optical switch disposed in an optical path between the at least one optical transmitter element and the at least one optical receiver element, the at least one optical switch comprising:
two or more fabric switches;
a first selector switch; and
a second selector switch,
wherein the first selector switch is configured to selectively pass a signal to one of the two or more fabric switches,
wherein the one of the two or more fabric switches that received the signal is configured to provide a switched signal to the second selector switch,
wherein the second selector switch is configured to selectively receive the switched signal provided by the one of the two or more fabric switches, and
wherein reconfiguration of the two or more fabric switches is characterized by a reconfiguration time, reconfiguration of the first selector switch and the second selector switch is characterized by a switching time, and the reconfiguration time of the fabric switches is longer than the switching time of the selector switches.

12. The optical network of claim 11, wherein the reconfiguration time is the time required for a fabric switch of the two or more fabric switches to reconfigure its internal parts in order to implement a different permutation.

13. The optical network of claim 11, wherein a slot of the optical switch is substantially equal to or less than the reconfiguration time of the fabric switches.

14. The optical network of claim 11, wherein the two or more fabric switches comprise n fabric switches, the first selector switch is a one to n demultiplexer, and the second selector switch is an n to one multiplexer.

15. The optical network of claim 11, wherein each of the two or more fabric switches, the first selector switch, and the second selector switch is an optical switch.

16. The optical network of claim 11, wherein each of the two or more fabric switches comprises a collection of switches arranged in a matrix configuration.

17. The optical network of claim 11, wherein at least one of the first and second selector switches is configured to amplify the signal or switched signal, respectively.

18. The optical network of claim 11, wherein the first and second selector switches are configured to select a fabric switch of the two or more fabric switches responsive to at least one of (a) an electrical or optical signal or (b) a wavelength that characterizes a signal to be provided/received responsive to the selection.

19. The optical network of claim 11, wherein the each of the two or more fabric switches are configured to reconfigure to a particular permutation responsive to an electrical or optical signal indicating the particular permutation.

* * * * *